United States Patent
Beringer et al.

(10) Patent No.: US 7,836,457 B2
(45) Date of Patent: Nov. 16, 2010

(54) HYBRID CONTEXTUAL FLOOR PLANS FOR OBJECT INSTANCES

(75) Inventors: Joerg Beringer, Frankfurt (DE); Michael Hatscher, Hamburg (DE); Sandra Nieves, Karlsruhe (DE)

(73) Assignee: SAP AG, Walldorf (DE)

( * ) Notice: Subject to any disclaimer, the term of this patent is extended or adjusted under 35 U.S.C. 154(b) by 1277 days.

(21) Appl. No.: 11/184,729

(22) Filed: Jul. 19, 2005

(65) Prior Publication Data

US 2006/0026558 A1 Feb. 2, 2006

(30) Foreign Application Priority Data

Jul. 19, 2004 (EP) ................... 04017027

(51) Int. Cl.
*G06F 9/44* (2006.01)
*G06F 17/00* (2006.01)
(52) U.S. Cl. ........................... 719/318; 700/90
(58) Field of Classification Search ............ None
See application file for complete search history.

(56) References Cited

U.S. PATENT DOCUMENTS

| | | | | |
|---|---|---|---|---|
| 7,512,623 B2 * | 3/2009 | Apps et al. | ............ | 707/102 |
| 2001/0049595 A1 * | 12/2001 | Plumer et al. | ............ | 703/22 |
| 2004/0119742 A1 * | 6/2004 | Silbey et al. | ............ | 345/760 |
| 2004/0119752 A1 * | 6/2004 | Beringer et al. | ............ | 345/779 |
| 2005/0222698 A1 * | 10/2005 | Eryurek et al. | ............ | 700/90 |

* cited by examiner

*Primary Examiner*—Van H Nguyen
*Assistant Examiner*—Abdou K Seye
(74) *Attorney, Agent, or Firm*—Holland & Knight LLP; Brian J Colandreo, Esq.; V. Raman Bharatula

(57) ABSTRACT

Methods and apparatus, including computer program products, for hybrid contextual floor plans for object instances. A method for providing a user interface for running business entities wherein data related to a process instance and data related to an object instance are managed in a uniform way, includes enabling a generalized meta model to unify process data and object data where there is a direct relationship between process and object instance, enabling an interface generator for directly generating a user interface from the generalized meta model, that allows the user to manipulate data either directly by manipulating the object data or indirectly by performing a process step, and enabling the user interface by the interface generator, the user interface providing a hybrid view of a process view representing phase data of an instantiated process instance and an object view representing object data of an instantiated object instance.

9 Claims, 3 Drawing Sheets

__US 7,836,457 B2__

HYBRID CONTEXTUAL FLOOR PLANS FOR OBJECT INSTANCES

CROSS REFERENCE TO RELATED APPLICATIONS

This application claims the benefit of priority from EP04017027.6, filed on Jul. 19, 2004, the entire content of which is incorporated herein by reference.

BACKGROUND

The present invention relates to data processing by digital computer, and more particularly to hybrid contextual floor plans for object instances.

In user interfaces used for running business instances, there are often scenarios with semantically connected business entities, such as collaboration tools that enable a group of people to jointly work on a given business object. These business entities are typically disconnected in the system and displayed in separated user interfaces. It becomes a user's task mentally establish a connection between the different business entities, such as, for example, a connection between an instantiated process and object data related to a particular phase of the process instance that form the user's business context.

It is desirable to provide a well structured user interface that allows coherent screens to reflect the work practice of the user in order to provide a good user experience.

SUMMARY

The present invention provides methods and apparatus, including computer program products, for hybrid contextual floor plans for object instances.

In general, in one aspect, the invention features a computer-implemented method for providing a user interface for running business entities wherein data related to a process instance and data related to an object instance are managed in a uniform way, the computer-implemented method including enabling a generalized meta model to unify process data and object data where there is a direct relationship between process and object instance, enabling an interface generator for directly generating a user interface from the generalized meta model, that allows the user to manipulate data either directly by manipulating the object data or indirectly by performing a process step, and enabling the user interface by the interface generator, the user interface providing a hybrid view of a process view representing phase data of an instantiated process instance and an object view representing object data of an instantiated object instance.

In embodiments, the interface generator can be arranged to provide a toggling option in the user interface for toggling between the process view and the object view in the hybrid view of the interface.

The interface generator can be arranged to provide the process view and the object view simultaneously in the hybrid view of the interface.

The hybrid view in the interface can provide functionality and information related to the instantiated process instance or the particular phase of the instantiated process in one dedicated screen area of the interface. The hybrid view in the interface can provide functionality and information related to the instantiated process instance or the particular phase of the instantiated process in one dedicated screen area of the interface.

The identification of the instantiated object and the instantiated process can be pre-modeled.

The identification of the instantiated object and the instantiated process can be performed upon instantiating an object and instantiating a process.

The invention can be implemented to realize one or more of the following advantages.

A consistent interface is provided that directly reflects the business context a user is interested in by providing a generalized meta model to unify process data and object data where there is a direct relationship between process and object instance.

An interface generator is provided for directly generating a user interface from the generalized meta model, which allows the user to manipulate data either directly by manipulating the object data or indirectly by performing a process step.

A user interface provides a hybrid view of a process view representing phase data of an instantiated process instance and an object view representing object data of an instantiated object instance.

The method relieves the user of the burden of mentally establishing the connection between semantically connected, but system-wide disconnected business entities. This reduces the user's navigation effort and increases efficiency. The user has a view on everything that contributes to her/his task and the business context at hand. Furthermore it reduces mental overhead, freeing up the user's mental capacities.

The interface generator can be arranged to provide a toggling option in the user interface for toggling between a process view and an object view in the hybrid view of the interface. The user's view can be toggled on the newly-connected business entities to focus the user's attention and to provide additional functionality and information, for example, by providing entity-specific functionality and information in one dedicated screen area of the interface. The method can merge simultaneous views in the interface related to the multiple set of instantiated business entities and display them e.g. side by side.

The method allows users to track a business entity's progress and work on the static data of this business entity at the same time. Team rooms or work flows previously disconnected from the business objects they refer to can are displayed together with the business object as intertwined virtual units.

The identification of the instantiated object and the instantiated process is pre-modeled, so that the system is caused to automatically create the multiple instances.

The identification of the instantiated object the instantiated process is performed upon instantiating an object and instantiating a process, thereby realizing a one-to-one relationship between primary object and process, or primary object and activity that is created by instantiating the process or activity.

One implementation of the invention provides all of the above advantages.

Other features and advantages of the invention are apparent from the following description, and from the claims.

BRIEF DESCRIPTION OF THE DRAWINGS

Like reference numbers and designations in the various drawings indicate like

DETAILED DESCRIPTION

Figure 1:
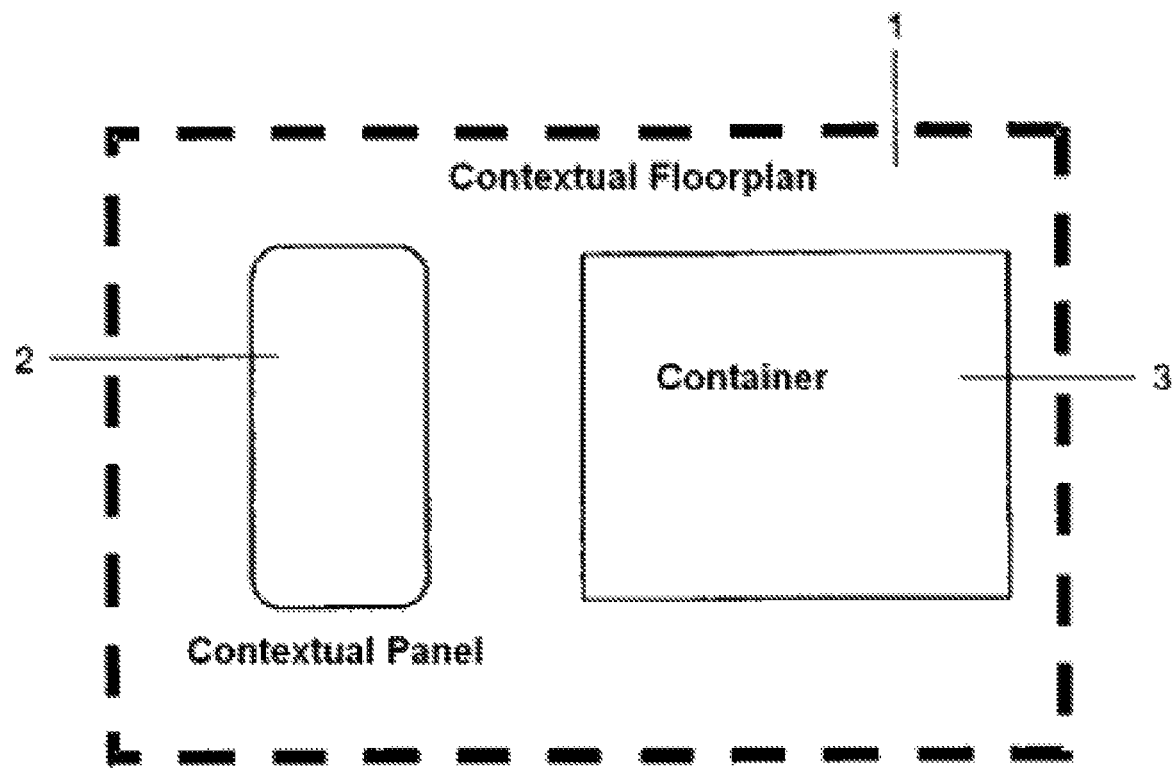
FIG. 1 is a block diagram of a user interface layout for an interface with a hybrid contextual floor plan.

Referring to FIG. 1, for simplifying the task of laying out a number of complex business entities into coherent focus areas a hybrid context-based application design concept offers predefined contextual floor plans for the most common types of work context. A hybrid contextual floor plan 1 includes a left hand contextual panel 2 that provides consistent navigation and access to contextual actions and views, and a right hand container or content area 3 for launching such views and actions in-place.

The floor plan 1 provides a consistent interaction paradigm for many fundamental context types that one typically finds in a business application. In particular, the right hand container 3 is arranged to provide a user interface (UI) to a number of context archetypes that reflect the most common work contexts. Some of them are activity oriented and others are work instance oriented. In particular, these archetypes can be categorized as follows:

Activity-centric contexts. This context is driven by a role, topic, task, or event that triggered this activity. Depending on the specific type, certain actions and resources are meaningful to this context and can be pre-configured as a context template. Activity-centric contexts usually have typical views like work lists, work status dashboards, resources, participants, and so forth.

Object-centric contexts. This context is determined by an object instance and includes related object operations, as well as views on all facets on the object. Different job roles may be interested in different facets of the same object type.

Process-centric contexts. This context is a work flow instance. Most actions are executed as predefined process steps. Because of the nature of work flow, selected steps may be owned by different users.

In work instance oriented contexts, a number of views or perspectives is presented, showing various aspects of a particular business situation. In particular, a particular object instance related to the situation or a particular process instance related to the situation is presented.

Important characteristics of a view are the following:

Views are not transactional. They do not need any "close," "cancel," or "done" buttons. However, they may include functions within their UI that launch transactional actions.

Views always stay within the same context. The user experience is not navigation but rather changing the perspective.

In this way, within a single context, a user can switch to different views for different purposes of assessing the context.

In contrast, in activity oriented work contexts, a user role is central of a specific user who has to perform certain activities in a certain work context. In addition, certain activities, while not directly related to a specific role in the organization, can be centralized around a specific business situation that arises, such as exception handling or other incidental tasks that may have to be performed in a business. Rather than being assigned to certain job roles of users in a business and the bundle of tasks related to the job roles, these contexts can models an ad-hoc activity space that is focused on a specific business problem or a specific task.

In browsing such a context, the context panel 2 lists actions that are relevant for the current work context. In contrast to views, actions are transactional and may even point to another related work context. Whenever possible, actions should be launched in-place in the right hand container.

Figure 2:
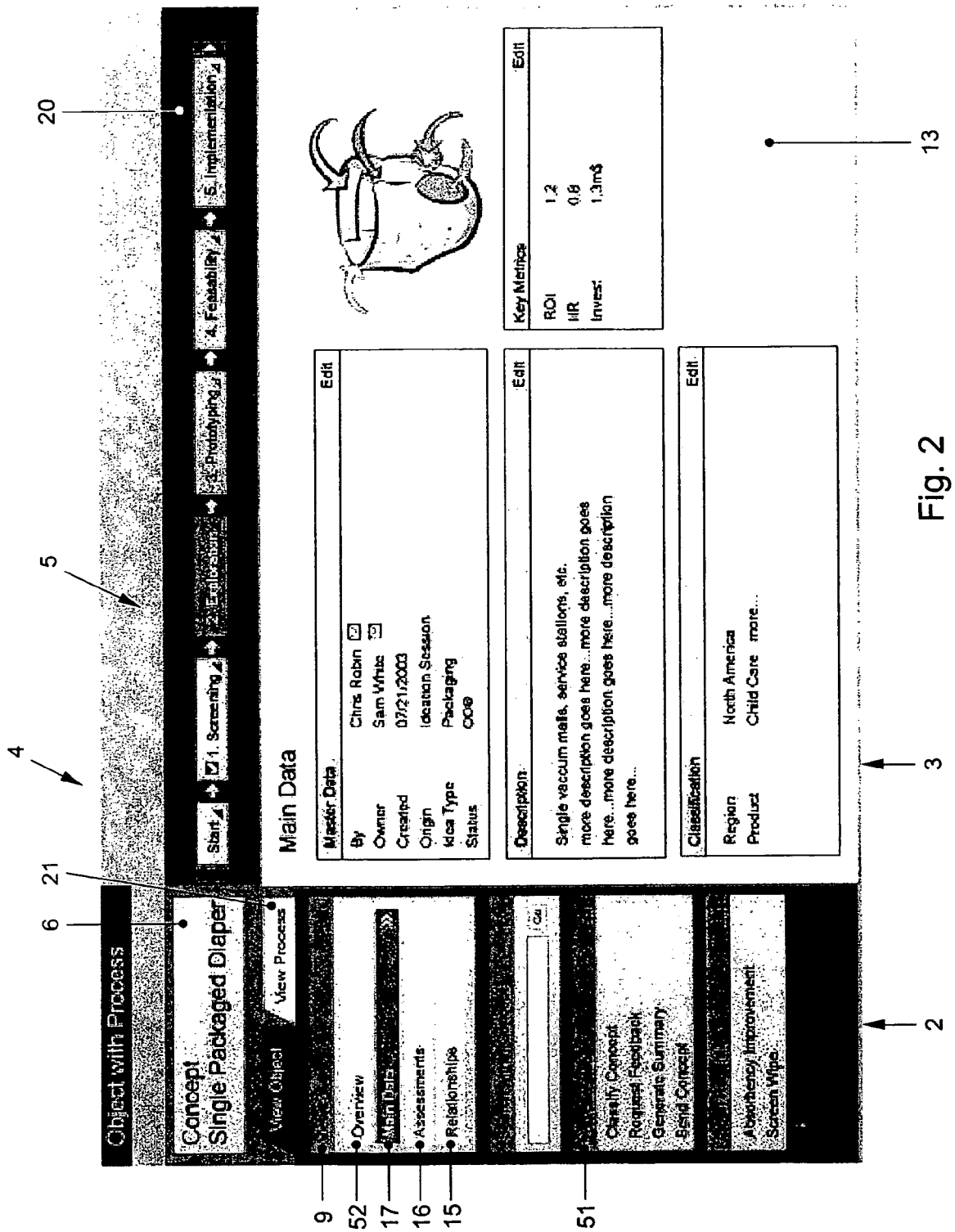
FIG. 2 is a block diagram of a specific hybrid contextual floor plan having a process instance and an object instance relating to a particular phase of the process instance, wherein the object instance is toggled.

Referring to FIG. 2, a specific hybrid contextual floor plan is represented. The Context Panel 2 includes a phase indicator 20 across the top of the content area to indicate that only one business entity is identified, like a business object instance such as an employee. Thus, the interface is an object instance view 4, also called an object-centered mode. In the object-centered mode 4, the user may choose between different views (perspectives) on a concrete instance of a business object including a "fact sheet"—like overview 5 and detailed views of different facets of the object. All functionality to manipulate and act on the object are provided.

According to the contextual views user interface layout, the object action pattern's layout features a contextual panel 2 ("CP") with an area for an instance identifier 6, as well as a content area 3 that displays the object's facets, or actions as chosen from the contextual panel 2, or from within a preceding action screen.

In particular, a fact sheet view of an object action pattern is shown. In the object instance view, different perspectives on the object can be presented, such as a class name view, a summary view, a status view and a facet view.

The class name view displays the master data of this object type. If required, those data may be grouped into several tabs as indicated by the figure.

The summary view displays a snapshot of this object with the most essential data. This is like a fact sheet or the overview page. It should inform the user about the basic facts and state of the object.

The status view provides status indicators as well analytics about this object.

The facet views provide specific perspectives on the object that represent a kind of sub-activity in itself. When user switch to a facet they also focus on managing a specific sub-aspect of the object.

Which of these views are appropriate to include into the object instance view depends on the characteristics of the particular object type. In addition, a main data view provides access to the main data of an object. If the amount of data does not fit on one screen, those data can be grouped by topic or any other intuitive category and displayed on tabs. While the fact sheet is for quick inspection and not for editing, this view is a read and write view to maintain the main data of the object instance—typically master data.

Object-specific perspective views can be presented as facet views. For complex objects, such additional views may be implemented, each representing a facet of the object. For example, foreign key relationships to other objects are candidates to let users manage such related data within a separate view. In a particular example, all orders related to a supplier, or all attachments related to a product concept, would be candidates for facets.

Such additional views are justified if the views represent a primary facet of the object with related actions. The facet becomes a sub-activity area for one particular aspect of the object. A facet of an object-centric view can be other documents related to the primary object. These other documents are shown in the content area when clicking on the corresponding view. Occasional tasks can be implemented as "you can" actions.

As shown in FIG. 2, two business entities are identified, i.e., a business object instance (e.g., relating to an employee) and a process instance (e.g., a promotion process of an employee). The phase indicator 20 indicates this information as a generalized meta model in order to quickly communicate that there is an process associated with the object.

The context panel 2 includes a mode switch 21, also called a toggle switch, allowing toggling between the two different business entity modes. A default view is the object view mode. It's features are the same as the ones of the basic user interface layout, except for the mode switch 21. In process view mode, a regular guided procedure runtime pattern is displayed, except for the Mode Switch 21 to toggle back to object view mode. In the example shown in FIG. 2, the phase indicator 20 is across the top and the View Area 9 and "you can also" area 51 are shown in the contextual panel 2.

The contextual panel 2 of the combination of object and process contains one additional element right below an identification ("ID") component 24, i.e., the mode switch 21. The mode switch 21 enables toggling between the object and the process view modes. In order to toggle between process and object view on the same business object, the mode switch 21 is used.

Figure 3:
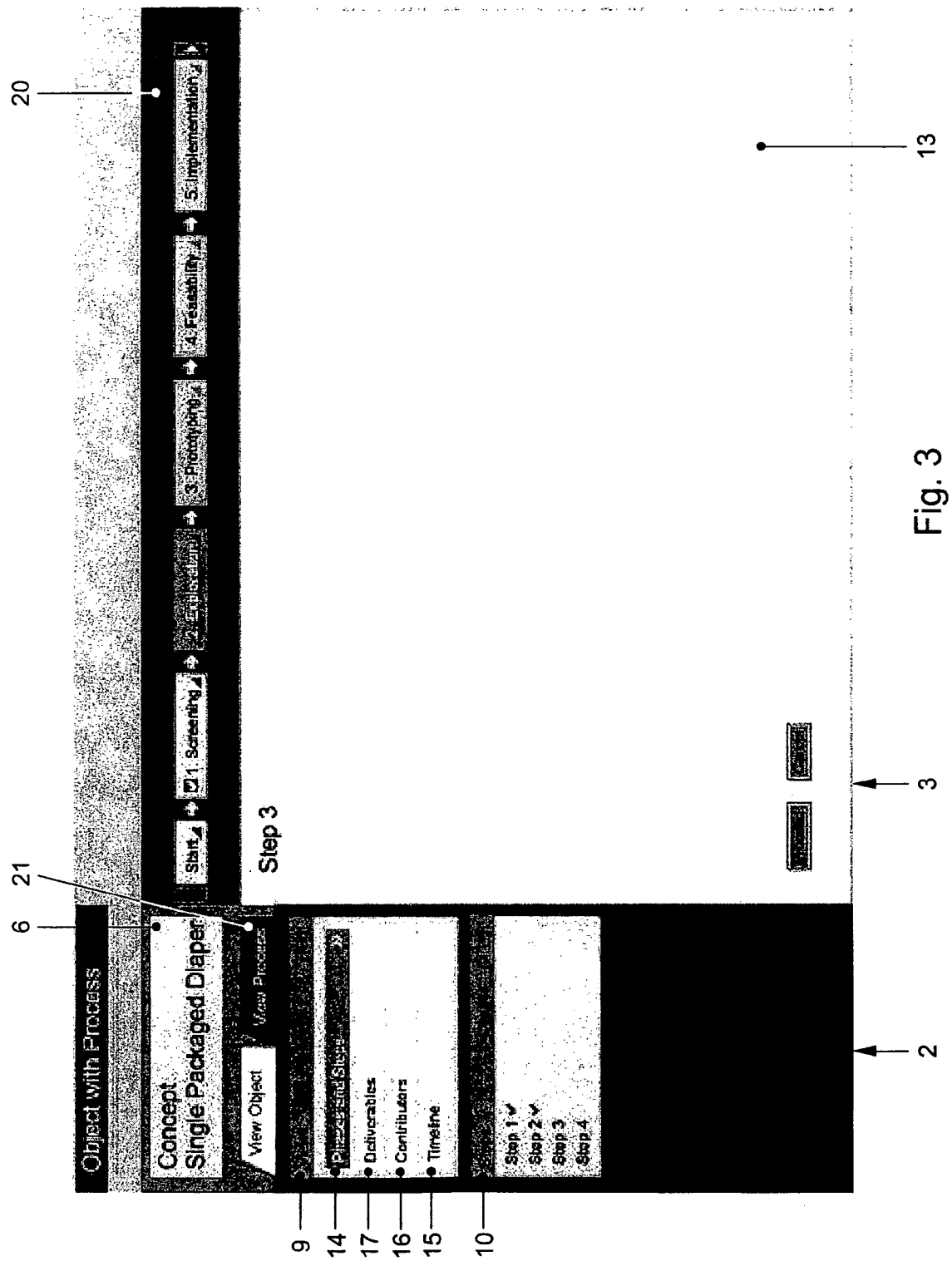
FIG. 3 is a block diagram of the specific hybrid contextual floor plan of FIG. 2 wherein the process instance is toggled.

FIG. 3 shows process views, while FIG. 2 shows object views. The process view does not show the "you can also" area 51 in the contextual panel 2, but instead offers a "steps" area 10. Toggling modes between process and object views the contextual panel's content changes.

Using either drop-down menu entries from the phase indicator 20 or the step tree 10, the user can activate certain actions coupled to the steps in the guided procedure. These actions are then displayed in the content area 13. Only available actions are displayed and active; non-available actions and phases are grayed out.

In particular, in the process view, the contextual panel 2 contains an instance identifier 6, a views area 9, and a guided procedure step tree 10. The content area 3 features the following elements: the phase indicator 20 as well as the area 13 containing the action, which takes up most of the display screen area (generally referred to as "real estate").

In this Guided Procedures view different perspectives are presented on the process or its objects, such as phases and steps, timeline, contributors, and deliverables.

The "phases and steps" process view 14 shows each step for the current phase; when selected, the corresponding action is shown in the content area. This view supports the user in working through the steps of the process.

The "timeline" view 15 shows the procedure along a timeline, making due dates and time frames more prominent. This view is particularly beneficial when milestones and deadlines are the focus.

The "contributors" view 16 shows all contributors involved in the procedure, which parts of the process they are involved in, and what their contributions are. Collaboration features in this view allow users to get in touch quickly with other contributors, push information to them, or replace them with someone else if need be.

The "deliverables" view 17 lists all output of each step that has been completed so far. This view is particularly beneficial for processes that orient themselves around deliverables tracking rather than a timeline or sequence of steps to complete.

The Overview, shown in the object view 52, but not shown in the process view, may show all phases with all their steps, the current status, and the owner of the step on one page. The overview gives at-a-glance information about the status of the procedure and its objects.

The hybrid contextual floor plan allows the user to manipulate data either directly by manipulating the object data (e.g., employee's data), or indirectly by performing a process step (e.g., performing a salary increase).

Besides the standard overview of "phase and steps" 14 that is guiding the user though the process, additional standard views can be provided for tracking the progress, for collaborating among all contributors, and for managing the proves by deliverables.

For example, the "deliverables" view 17 provides functions to track and manage deliverables that are associated with a process instance. The view lists the status, and the responsible user. The view also supports related tasks like task assignment and document check in and versioning control.

In addition, the "contributors" view 16 opens a list of all the people participating in a given process instance. It offers related ad-hoc collaboration tools to coordinate and communicate with all participants. A process owner can assign tasks to selected users as well as add and remove contributors and assess a single person's contribution to the overall process. It allows users, for example, but not limited to, to track a business entity's progress and work on the static data of this business entity at the same time. Likewise, for example, team rooms or work flows previously disconnected from the business objects they refer to can now be displayed together with the business object as intertwined virtual units.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computer-implemented method for providing a user interface for running business entities wherein data related to a process instance and data related to an object instance are managed in a uniform way, the computer-implemented method comprising:

enabling a generalized meta model to unify process data and object data, the generalized meta model communicating that there is a direct relationship between the process instance and the object instance and modeling an ad-hoc activity space focused on a business problem;

enabling an interface generator for directly generating a user interface from the generalized meta model, the user interface including one or more features that allows for manipulation of data either directly by manipulating the object data or indirectly by performing a process step; and enabling the user interface by the interface generator, the user interface providing a hybrid view of a process view representing phase data of an instantiated process instance and an object view representing object data of an instantiated object instance;

Wherein the user interface interfaces with a plurality of context archetypes that reflect, a work context, an activity-centric context driven by a role, topic, task and event that triggered an activity, an object-centric context determined by the object instance and including related object operations and views on all facets on the instantiated object instance, a process-centric context that is the a work flow instance, and a work instance oriented context including views and perspectives showing a particular aspect on the business problem and a particular instance on the instantiated process instance related to the business problem.

2. The computer-implemented method of claim 1 wherein the interface generator further is arranged to provide a toggling option in the user interface for toggling between the process view and the object view in the hybrid view of the interface.

3. The computer-implemented method of claim 1 wherein the interface generator further is arranged to provide the process view and the object view simultaneously in the hybrid view of the interface.

4. The computer-implemented method of claim 2 wherein the hybrid view in the interface provides functionality and information related to the instantiated process instance or the particular phase of the instantiated process instance in one dedicated screen area of the interface.

5. The computer-implemented method of claim 3 wherein the hybrid view in the interface provides functionality and information related to the instantiated process instance or the particular phase of the instantiated process instance in one dedicated screen area of the interface.

6. The computer-implemented method of claim 1 wherein identification of the instantiated object and the instantiated process is pre-modeled.

7. The computer-implemented method of claim 1 wherein identification of the instantiated object and the instantiated process is performed upon instantiating an object and instantiating a process.

8. The computer-implemented method of claim 1 wherein the object data is employee data and the process is performing a salary increase.

9. The computer-implemented method of claim 1 wherein the object instance relates to an employee and the process instances relates to a promotion process of the employee.

* * * * *